Figure 3:
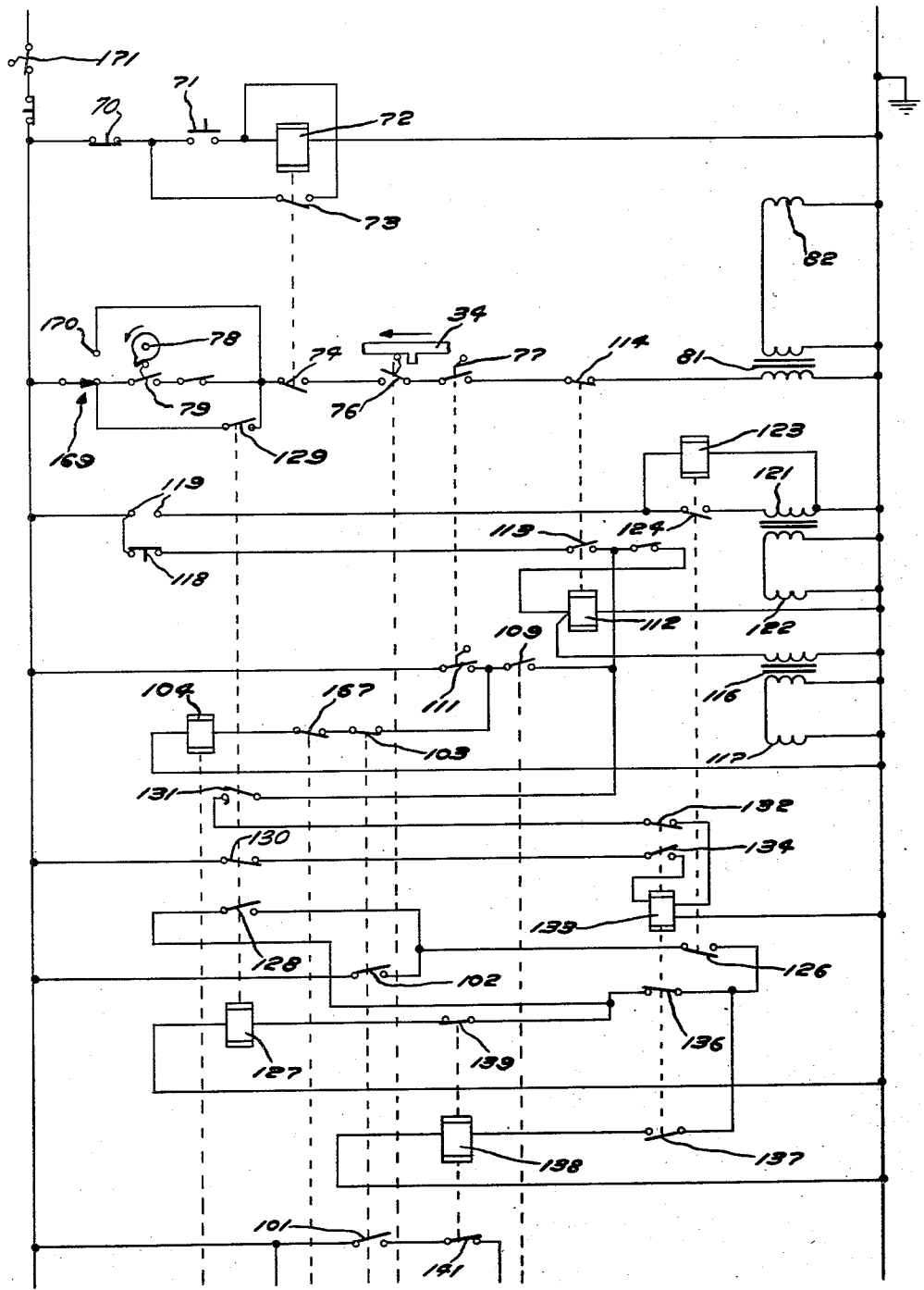
Figure 4:
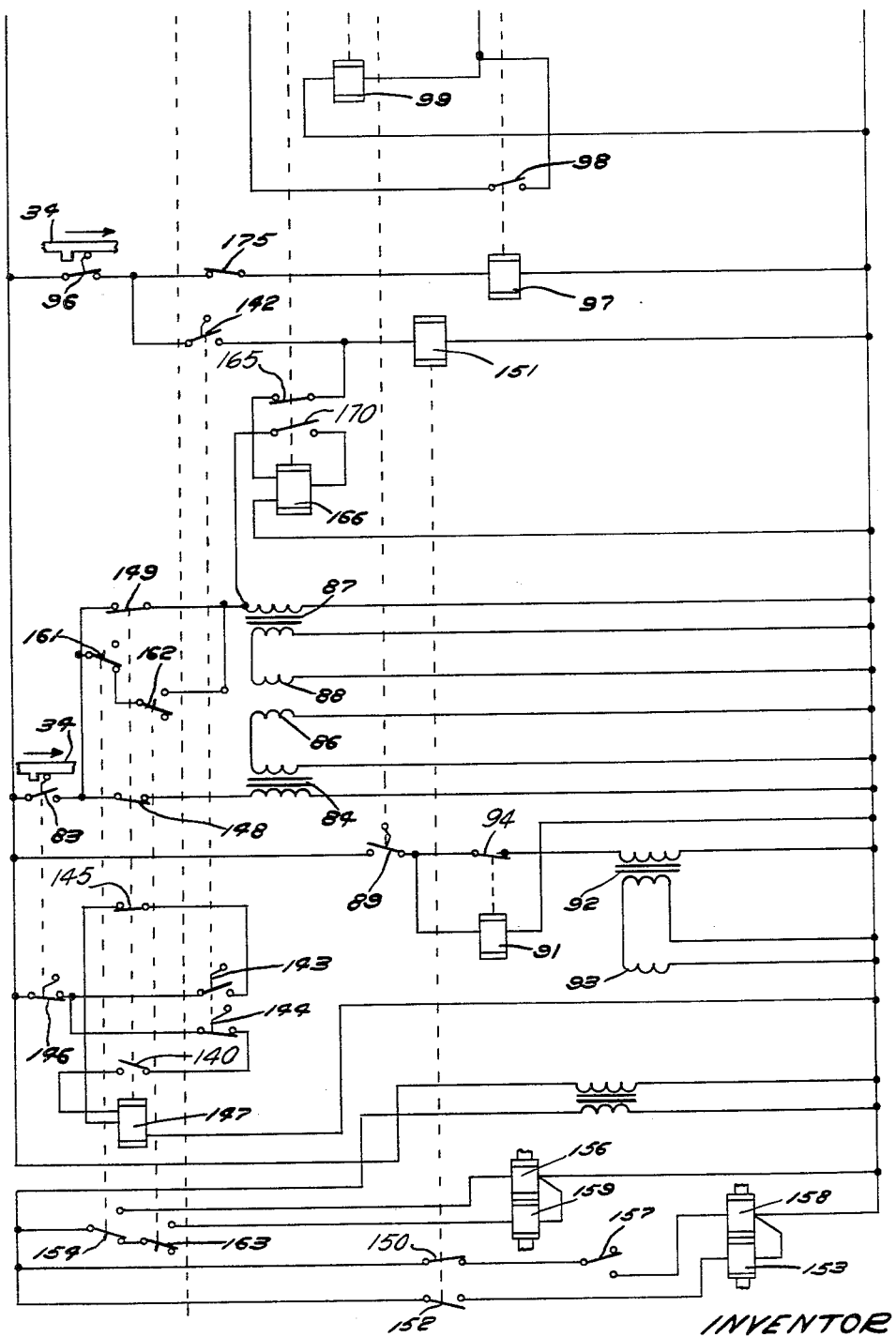

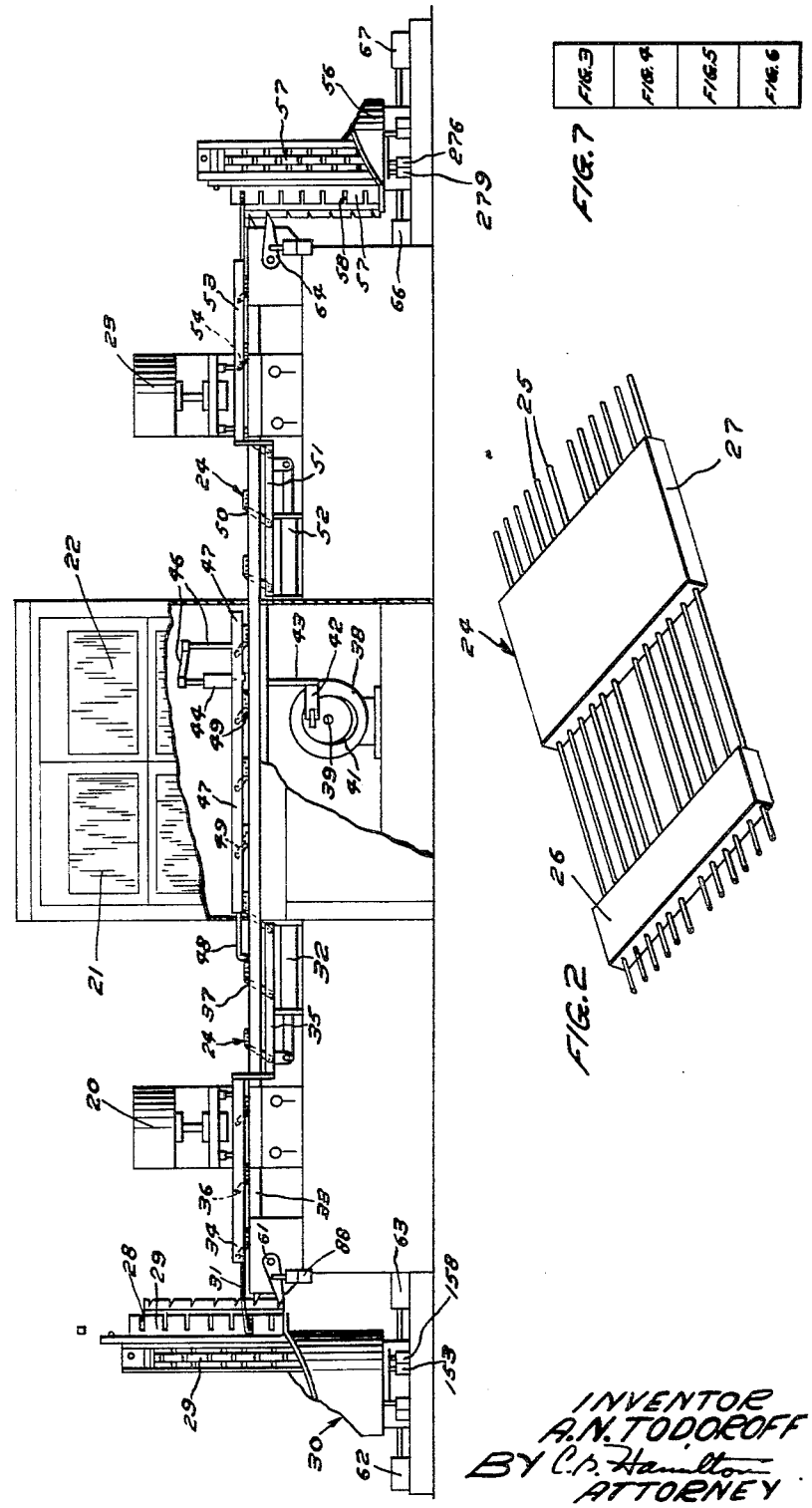

INVENTOR
A.N. TODOROFF
BY C.B. Hamilton
ATTORNEY

United States Patent Office 2,935,172
Patented May 3, 1960

2,935,172

APPARATUS FOR SEQUENTIALLY ADVANCING WORK PIECES THROUGH A SERIES OF FABRICATING MACHINES

Alexander N. Todoroff, Chicago, Ill., assignor to Western Electric Company, Incorporated, New York, N.Y., a corporation of New York Application December 27, 1956, Serial No. 630,845

16 Claims. (Cl. 198—19)

This invention relates to apparatus for sequentially advancing work pieces through a series of fabricating machines, and more particularly to a multisection feeding apparatus for advancing work pieces through a series of fabricating machines where certain of said fabricating machines are operated at different speeds with respect to the remainder of the machines.

In manufacturing installations utilizing a series of machines for performing a succession of fabricating operations on work pieces or parts sequentially fed through the machines, it is usually necessary to operate the overall feed mechanisms at a speed commensurate with the speed of the slowest machine in the installation. If attempts are made to increase the operating speeds by duplicating certain of the slower machines and having said machines operate on alternate work pieces, then it becomes necessary to modify the feed mechanism to feed two parts from the faster machines to the feeder mechanism associated with the duplicate slower machines for each cycle of operation of a slower machine. In a like manner the feed apparatus associated with the remaining of the faster operating machines must be capable of accepting two parts from the feeder apparatus associated with the slower machines upon each cycle of operation of the slower machines.

It is a primary object of the invention to provide feed apparatus for advancing parts through a series of machines operating at various speeds.

Another object of the present invention resides in an electrical system for controlling the cyclic operation of a series of feed mechanisms capable of feeding different numbers of work pieces during each period of operation thereof.

A further object of the invention is the provision of a series of fabricating machines operating at different speeds together with an electrical system operated by the slowest machine for controlling the feed mechanisms associated with the other machines.

A still further object of the invention resides in a fabricating installation having indexible supply and receiving magazines with facilities for interrupting the operation of the fabricating machines upon either magazine being indexed.

Another object of the invention resides in a series of machines wherein facilities are provided for operating certain of the machines through a predetermined number of cycles whereafter further cyclic operations are dependent upon the remainder of the machines completing a cycle of operation together with facilities for precluding further cyclic operation of said remainder of the machines until said certain machines complete said predetermined number of cycles of operation.

With these and other objects in view, the present invention contemplates the use of a series of three or more fabricating machines and facilities for transferring parts from a supply magazine through the machines to a receiving magazine. In the present description, the first machine is described as being a ram-operated forming machine, the second machine is a welding machine and the third is another ram-operated forming machine, but it is to be understood that numerous other fabricating machines can be substituted and the advantages and principles of the present invention be utilized. The work piece utilized to illustrate the present invention is a wire spring relay comb that consists of a plurality of wire conductors held in position by spaced phenolic blocks. It will be also understood from the following detailed description that the present invention can be readily utilized to effectuate the fabrication of many sundry types of work pieces.

The first ram-operated machine operates at a speed which is twice the speed of the second and approximately equal to that of the third. However, the second machine is provided with instrumentalities for fabricating two work pieces simultaneously; consequently, the transfer mechanism associated with the first machine delivers two work pieces to the second for each operation of the transfer mechanism associated with the second machine. During each cycle of operation of the second or welding machine, two work pieces are delivered to the transfer mechanism associated with the third ram-operated machine. Controls similar to those associated with the first transfer mechanism are associated with the third transfer mechanism so that the third mechanism executes two cycles of operation for every cycle of operation of the second machine.

Cam controlled timing means actuated by the welding machine are associated with the first and third transfer mechanisms to insure that the first and third machines do not execute more than two cycles of operations during a single cycle of operation of the second or welding machine. In addition, relay control means are associated with the first and third machines to insure that the welding machine does not execute more than a single cycle of operation during two cycles of operations of the first and third machines.

Multi-magazine supply and receiving devices are respectively positioned to feed work pieces to the first transfer mechanism and receive work pieces from the third transfer mechanism. As a magazine becomes empty or full, indexing means are rendered effective to advance a new magazine into position to either supply or receive work pieces. The relay control circuit includes instrumentalities for precluding the cyclic operation of all the machines whenever there is an indexing operation of either magazine device. The construction of the magazine devices are more clearly shown and described in the co-pending application of E. W. Larsen et al., Serial No. 446,312, filed July 28, 1954, now Patent No. 2,846,832.

Other objects and advantages of the present invention will be apparent from the following detailed description when considered in conjunction with the accompanying drawings, wherein Fig. 1 is a front elevational view of a series of machines that successively process or fabricate work pieces in accordance with the principles of the present invention;

Fig. 2 illustrates a typical work piece that is to be processed by the machine shown in Fig. 1, and Figs. 3, 4, 5 and 6 when assembled in the manner depicted in Fig. 7 show a circuit for controlling the work cycles of the transfer mechanisms associated with the machines shown in Fig. 1.

Referring to Fig. 1, there is shown a series of machines 20, 21, 22 and 23 for successively performing work operations on a wire spring relay comb 24 such as shown in Fig. 2. This comb comprises a plurality of laterally spaced wires 25 held in position by a pair of phenolic blocks 26 and 27. It is desired to first trim the wires 24 by means of the trimming device 20 then weld small precious or semiprecious metal contacts to the trimmed terminals of the wires by means of the welding machines 21 and 22, and finally realign the lateral positionment of the wires by means of the ram-operated aligning press 23. Welding machines 21 and 22 are positioned to operate upon alternate wire spring relay combs 24 fed thereto and may be of the general type shown in the patent to H. A. Myers, Patent No. 2,771,539, issued November 20, 1956.

In Fig. 1 the combs 24 to be fabricated are stored within slots 28 formed in magazine racks 29. The racks 29 are held in an indexible magazine device 30 such as shown in the aforeidentified Larsen et al. co-pending application. This indexible magazine device will function to successively advance combs to a position adjacent to a reciprocating feed arm 31 actuated by an air cylinder 32. As the feed arm 31 is moved toward the right, the comb 24 will be advanced onto a guideway 33. It will be noted that arm 31 is attached to a transfer bar 34 having depending therefrom a plurality of feed pawls 36 that function to advance the comb along the guideway 33 in step-by-step fashion as the air cylinder 32 imparts a reciprocating movement to the transfer bar. The details of construction of the transfer bar mechanism are further explained in greater detail in the co-pending application of C. R. Rasmussen et al., Serial No. 465,276, filed October 28, 1954, now Patent No. 2,861,676, issued on November 25, 1958. The transfer bar 34 is connected to a second transfer bar 35 having a plurality of pawls 37 extending upwardly therefrom and through the guideway 33 to further advance the combs 24 along the guideway 33.

The welding machines 21 and 22 are driven by a motor 38. This motor also drives a shaft 39 having a cam 41 mounted thereon to impart an oscillatory motion through a follower 42 to a shaft 43 pivotally mounted within a bushing 44. Oscillatory movement of the shaft 43 is also imparted through a linkage 46 to a transfer bar 47 having an arm 48 extending therefrom to engage and advance the combs as they are advanced by the last pawl 37. The welding machines 21 and 22 are of the general type shown in the patent to E. W. Larsen, Patent No. 2,749,-419, issued June 5, 1956, and are positioned to simultaneously perform welding operations on two combs 24. Transfer bar 47 is also provided with depending pawls 49 for advancing the combs along the guideway 33 to be picked up by pawls 50 extending from a transfer bar 51. An air cylinder 52 is provided to reciprocate the transfer bar 51. Transfer bar 51 is connected to a further transfer bar 53 having pawls 54 depending therefrom to engage and advance the combs toward a second indexible magazine device 56. The construction of indexible device 56 is very similar to the indexible device 30 and is provided with racks 57 having slots 58 formed therein for receiving the combs advanced from the terminus of the guideway 33.

It may be appreciated that if two welding machines 21 and 22 are provided to operate on two wire spring combs 24 then the transfer bar 47 must advance two combs within the welding machines during each cycle of operation thereof. Inasmuch as the ram-operated machine 20 only operates on one comb at a time, it is necessary that the transfer mechanism associated therewith advance two combs into position to be engaged by the transfer mechanism associated with the welding machines 21 and 22. In a similar manner, the ram-operated machine 23 only operates on one comb at a time; consequently, this machine must execute two cycles of operation for every single operation of the welding machines 21 and 22. Further it is to be understood that the transfer mechanism associated with the machine 23 must execute two cycles of operation during each cycle of operation of the welding machines 21 and 22.

The lefthand magazine device 30 is provided with a pawl 61 that functions to advance a comb 24 into position to be engaged by the arm 31 during each cycle of operation of the transfer mechanism associated with machine 20. Upon exhaustion of the combs in any magazine rack, facilities including a pair of air cylinders 62 and 63 are rendered effective to index the magazine device 30 to present a fully loaded magazine into position to supply combs to the reciprocating transfer arm. Magazine device 56 is also provided with a pawl 64 and air cylinders 66 and 67 for insuring that an empty slot is positioned in register with the transfer mechanism associated with the machine 23 during each cycle of operation thereof.

Control of the heretofore described components is obtained through the instrumentality of a control circuit shown in Figs. 3, 4, 5 and 6. Considering first the circuits shown in Figs. 3 and 4 and that the system is at rest and that the lefthand magazine racks 29 are loaded with wire spring relay combs 24, then to initiate operation the attendant will close a stop switch 70 and a start switch 71 to energize a relay 72 that draws up a locking contact 73 and a conditioning contact 74. If the transfer bar 34 is in the extreme lefthand position so as to be able to pick up a comb 24, then a limit switch 76 is closed. Further assume that the ram on the press 20 is withdrawn then a further switch 77 is closed. In addition, assume that the motor 38 has been energized, then a cam 78 mounted on shaft 39 will momentarily close a contact 79 to complete an energizing circuit to the primary of a transformer 81. Energization of transformer 81 affects the energization of a solenoid 82 associated with the air cylinder 32 so as to cause the air cylinder to advance the transfer mechanism toward the right as viewed in Fig. 1. The transfer bars 34 and 35 will advance all the combs on the guideways 33 one increment toward the right, and as the transfer bar completes its forward movement, a limit switch 83 is closed to complete an energizing circuit to the primary of the transformer 84. When this transformer is energized, a solenoid 86 is also energized to control the air cylinder 32 to reverse the direction of movement of the transfer bars 34 and 35.

The closure of switch 83 also effectuates the energization of another transformer 87 that controls the energization of a solenoid 88. Energization of solenoid 88 effectuates an operation of the pawl 61 (see Fig. 1) to cause the magazine rack 29 to advance one increment and present a new comb 24 to the arm 31.

When the transfer bars 34 and 35 retract, a contact 89 is also closed to complete an energizing circuit to a time delay relay 91. Closure of contact 89 also effectuates an energization of a transformer 92 that in turn energizes a solenoid 93 to effectuate a withdrawal of the pawl 61 to the position shown in Fig. 1. After a slight delay relay 91 will open contacts 94 to interrupt the energizing circuit to the transformer 92. The apparatus is now in condition for another cycle of operation.

When the transfer bars 34 and 35 move forward to advance the combs, a momentary impulse switch 96 is closed to energize a relay 97 that functions to draw up contacts 98 to complete an energizing circuit for a relay 99. Relay 99 is held energized through holding contacts 101, and further functions to close contacts 102 and open contacts 103. Contacts 103 are contained in an energizing circuit for a relay 104. Relay 104 when energized will close contacts 106 contained in a circuit including a solenoid 107 that functions to control the release of a clutch 108 interconnected between the shaft 39 and the motor 38 (see Fig. 5). It will be understood that with the transfer bar in the forward position contact 103 is opened, and as a result the energizing circuit for the relays 104 and 107 are incomplete and the welders 21 and 22 cannot initiate a further cycle of operation.

When relay 97 is energized, it also functions to close contacts 109 which completes an energizing circuit through switch contacts 111, that are closed when the ram in the machine 20 is in the up position, to a relay 112. Relay 112 completes a locking circuit through contacts 113 and also functions to open contacts 114 contained in the circuit for advancing the transfer bars 33 and 35. Closure of contacts 109 also completes an energizing circuit for a transformer 116 that functions to energize a solenoid 117 that controls the downward movement of the ram in the machine 20. It may be thus understood that while the ram is moving downwardly, the transfer bars 33 and 35 cannot be moved forward.

As the ram of machine 20 reaches the lower extremity of the stroke, hydraulic pressure is built up actuating a pressure switch 118 to close with contacts 119 to condition an energizing circuit for the primary of a transformer 121 that functions to energize a solenoid 122. This solenoid controls the reverse of hydraulic pressure in the ram to allow the ram to move up to the initial position. Closure of contacts 119 also effectuates the energization of a relay 123 that draws up contacts 124 to complete the energizing circuit to the primary of the transformer 121.

Relay 123 also functions to close contacts 126, and since contacts 102 are already closed, an energizing circuit will be completed to a relay 127. A holding circuit for the relay 127 is completed through contacts 128 and the relay also functions to open contacts 130 and close shunt contacts 129 connected around the cam-operated contacts 79. It will be recalled that the momentary closure of contacts 79 initiated a cycle of operation of the transfer bars 33 and 35; consequently, the completion of the shunt circuit allows a second cycle of operation to be initiated for the transfer bars. This second cycle will be initiated as soon as the ram on the machine 20 is restored to the initial position and the switch 77 is closed, and the transfer bar is fully retracted to close the limit switch 76.

The second cycle is started when the transfer bar advances again removing a comb from the magazine 28 and moving the other combs forward one position. Limit switches 83 and 96 (Fig. 4) are again actuated as the transfer bar completes its forward movement. The actuation of limit switch 83 retracts the transfer bars in the manner previously described. The relay 97 is again energized and the contacts 109 are drawn up to complete an energizing circuit through the contacts 111, through now closed contacts 109 and contacts 131 held closed by the now energized relay 127, through contacts 132 to the one coil of a mechanically held relay 133. Relay 133 has two coils and upon energization of the tapped coil through contact 132, the relay is energized whereas completion of an energizing circuit through the coil connected to contacts 134 and contacts 130 of relay 127 results in a release of the relay. Energization of relay 133 causes contacts 136 to open and contacts 137 to close.

The energization of relay 97, upon completion of the forward movement of the transfer bars 33 and 35, again closes contacts 109 to complete the energizing circuit for the transformer 116, thereby energizing solenoid 117 to allow the ram of the machine 20 to go down for a second time. As the hydraulic pressure is built up, the pressure switch 118 is again actuated to close contacts 119 to energize relay 123. Energization of relay 123 again draws up contacts 126 to now complete an energizing circuit through contacts 102, through contacts 126 through the now closed contacts 137 of energized relay 133 and through a relay 138. Relay 138 draws up contacts 139 to interrupt the previously energized relay 127, and also draws up contacts 141 to interrupt the energizing circuit for the previously energized relay 99. It will be recalled that relay 127 held contacts 129 closed to permit recycling without closure of the contacts 79; consequently, the control circuits are now restored to the initial condition in anticipation of another closure of the contacts 79 by the cam 78 mounted on the shaft 39 of the drive means for the welders 21 and 22. Another cycle of operation will be started as soon as the press rams in the machine are restored to the up position to close contact 111 which will function to complete the circuit to the relay 104 that in turn controls the release of the clutch 108.

Removal of the combs from the magazine continues as previously explained until the next to the last comb is removed. When the transfer bar is moved to the forward position, the contacts 83 are again operated to complete the energizing circuit for the transformer 84 and the magazine lifting pawl solenoid 86 is operated to present the last comb to the transfer mechanism. As the magazine is raised, a pair of switches 142 and 143 are closed and a switch 144 is opened. With the transfer bar in the forward position, a switch 146 is held open and since switch 96 is only a momentary impulse switch, that is closed and opened prior to the closure of switches 142 and 143, nothing is operated by the closure of switches 142 and 143. When the transfer bars retract, switch 146 closes completing an energizing circuit through a tapped coil of a mechanically held relay 147 causing contacts 140 to close and contacts 145, 148 and 149 to open. With the next forward movement of the transfer bars that functions to remove the last comb from the magazine the actuation of switch 83 is ineffective to retract the transfer bars or raise the magazine because contacts 148 and 149 associated with relay 147 are open. The forward movement of the transfer bar actuates the momentary impulse limit switch 96 to complete an energizing circuit through now closed contacts 142 to a relay 151 that functions to open contacts 150 and close contacts 152 thereby completing an energizing circuit for a solenoid 153. This solenoid controls the positionment of a shot pin associated with the magazine device 30. Therefore, the withdrawal of the shot pin will permit an indexing operation to be imparted to the magazine device. Withdrawal of the shot pin actuates a switch 154 into position to complete an energizing circuit for a solenoid 156 that functions to actuate the air cylinder 62 to index the magazine device 30 to present a new magazine to the withdrawing arm 31. As the magazine device is indexed to the new position, the switch 142 is opened to deenergize relay 151 to close contacts 150 and a switch 157 is closed to energize a solenoid 158 that functions to move a shot pin back into locking position. With the restoration of the shot pin, the switch 154 moves into engagement with its lower contacts to complete an energizing circuit for a solenoid 159 that functions to energize the air cylinder 63 to restore the indexing mechanism associated with the magazine device to the initial position.

Recalling that the energization of the relay 147 opened the contacts 149 to preclude the movement of the transfer bars, and that the transfer bars are now in a retract position holding contacts 83 closed, then the restoration of the shot pin to a locking position not only restores the switch 154, but also effectuates the closure of a switch 161 to complete a by-pass circuit for the transformer 87. The transfer bars will now be retracted to pick up a comb from the newly presented magazine. The energization of the solenoid 159 to retract the actuating mechanism for the magazine device 30 also effectuates the opening of a pair of switches 162 and 163; therefore, restoring the magazine indexing control circuit elements to the initial condition. Obviously, when the new magazine is in position, switch 142 is opened and the switch 143 is opened to release relays 151 and 147, and the switch 144 is again closed to again condition these relays for a subsequent cycle of operation.

In summary, when there are two or more combs in the magazine, the actuation of cam switch 78 permits the automatic delivery of two combs and the circuit will be then held in an inoperated condition until the contacts 79 again close. In a situation where there are only two combs left in the magazine the actuation of the contacts 79 allows the transfer bars to deliver two combs and then the circuit will be held in an non-operative condition until such time as the magazine device 30 completes its indexing operation. If a situation exists where there is only one comb in the magazine then the transfer bars will advance that comb, and be held in a stationary position until such time as a new magazine has been advanced, whereafter the circuit will actuate the transfer bars to deliver the second comb.

Figure 5:
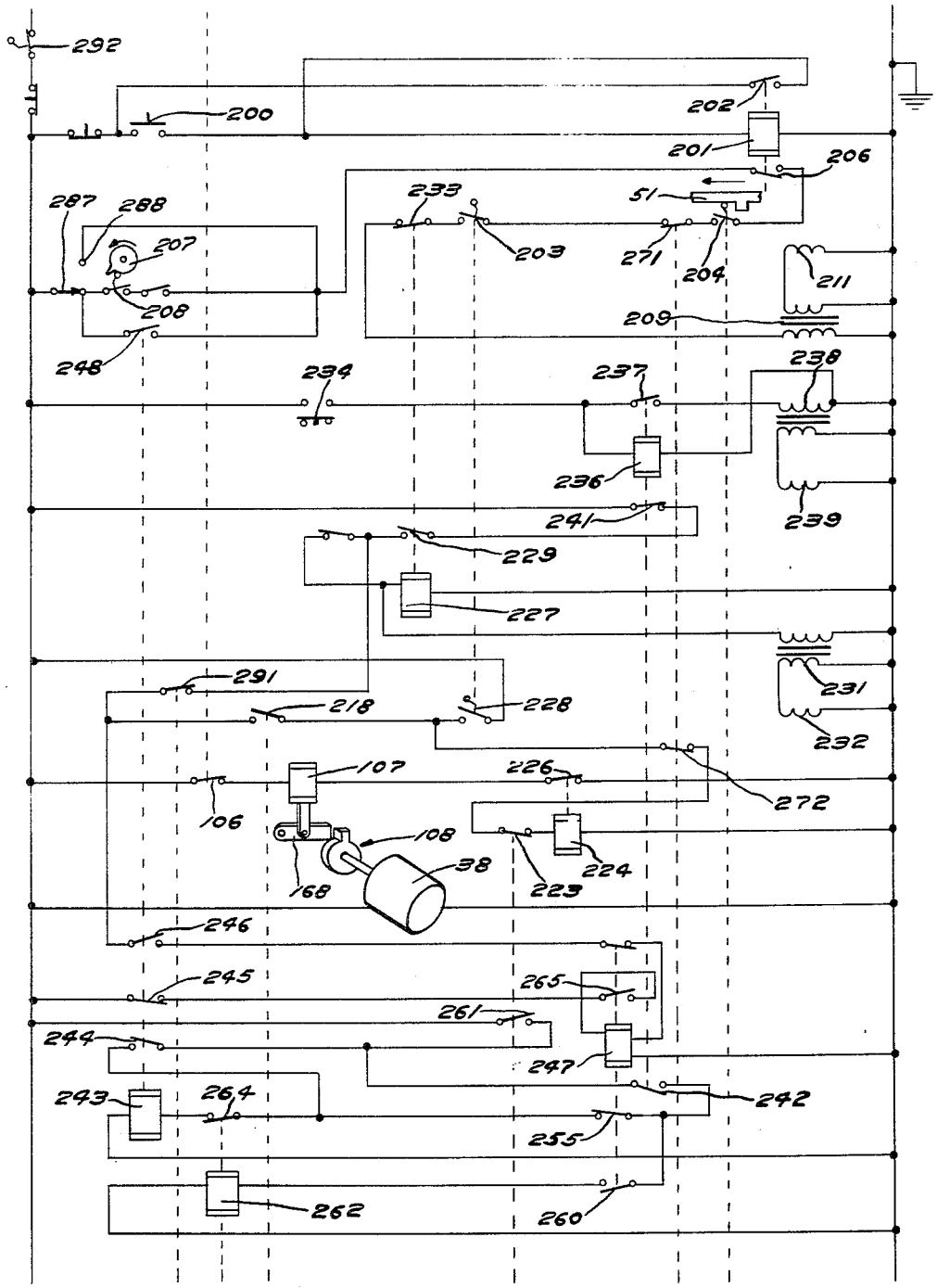

The operation of the welding machines 21 and 22 is interrupted during the indexing of the magazine device 30. This is true since the closure of the switch 142 by the advance of the magazine to position the last comb to be removed also effectuates the energization of a tapped coil mechanically held relay 166 which opens normally closed contacts 167 contained in the energizing circuit for the relay 104. Relay 166 also opens contacts 165 and closes contacts 170. It will be remembered that the relay 104 controls the contacts 106 that in turn control the energization of the solenoid 107 (Fig. 5). Release of solenoid 107 moves a clutch release pawl 168 into position to interrupt the operation of the clutch 108. Relay 166 is released when the energizing circuit is completed to the transformer 87 which occurs as soon as the magazine device has completed its indexing operation.

By moving a tapped switch 169 into an automatic position indicated by the contact 170, the cam actuated switch 79 is by-passed and the transfer mechanism will cyclically operate independently of the welder. Combs may be transferred by the transfer mechanism without the press rams in the machine 20 operating by opening a switch 175. In addition, the circuit is provided with a switch 171 associated with the transfer bar mechanism so as to open upon the transfer bar jamming or a mechanical overload existing. Obviously, opening of the switch 171 interrupts the energizing circuits to all the control relays, and as a result the machines will come to a stop.

Figure 6:
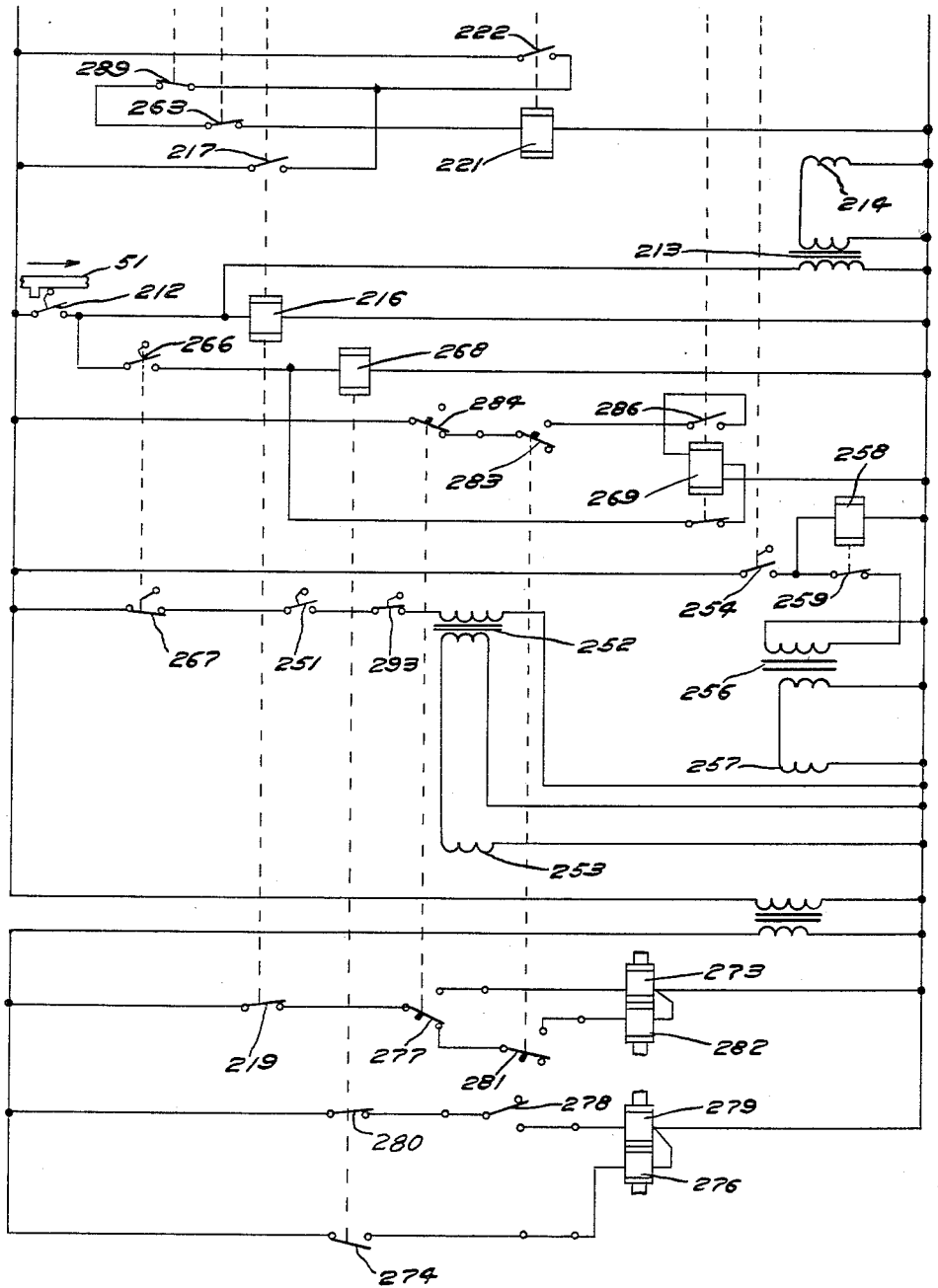

Considering now the circuits shown in Figs. 5 and 6 which are designed to control the actuation of the transfer bars 51 and 53 so as to move the combs along in one step increments in timed relation to the advance thereto of two combs by the transfer mechanism 47 associated with the welders 21 and 22.

In order to initiate the circuits in Figs. 5 and 6, a push button 200 is closed to energize a relay 201 that is held energized through its contacts 202. Assume that the ram in machine 23 is in the up position, then a limit switch 203 is closed. Further assume that the transfer bar 51 is in the extreme lefthand or retract position, then a limit switch 204 is closed. When the relay 201 is energized, contacts 206 are closed; consequently, when a cam 207 mounted on shaft 39 closes a switch 208 shortly after closure of switch 79 by cam 78, an energizing circuit will be mometarily completed for a transformer 209. The secondary of this transformer is connected to actuate a solenoid 211 that controls the air cylinder 52 to cause said air cylinder to move the transfer bars 51 and 53 toward the right. If the guideways 33 have sufficient combs mounted thereon, the comb on the extreme righthand extremity of the guideway is moved into a slot 58 formed in the magazine 57. Upon advance of the transfer bars toward the right, a limit switch 212 is operated to complete an energizing circuit for a transformer 213. Energization of transformer 213 energizes a solenoid 214 to control the reverse operation of the air cylinder 52 to cause the transfer bars 51 and 53 to move back in a leftwardly direction.

Closure of limit switch 212 also effectuates the energization of a relay 216 causing contacts 217 and 218 to close and contacts 219 to open. Closure of contacts 217 results in the energization of a relay 221 that locks up through its contacts 222. When relay 221 is energized, contacts 223 are opened to interrupt an energizing circuit for a relay 224 that controls a contact 226 contained in the energizing circuit of the solenoid 107. It may be thus appreciated that when the transfer bars are in the righthand position, the clutch release pawl 168 is positioned to preclude release of the clutch 108 and the welder cannot initiate a cycle of operation.

The closure of contacts 218 by the energization of relay 216 effectuates an energization of a relay 227 through a limit switch 228 that is closed when the ram in the machine 23 is in the up position. Energization of relay 227 completes a locking circuit through contacts 229 and also a circuit through a transformer 231. Transformer 231 controls the energization of a solenoid 232 that in turn controls the downward movement of the ram in the machine 23. Relay 227 also opens contacts 233 to preclude forward movement of the transfer bars 51 and 53.

As the ram reaches the bottom of the stroke, hydraulic pressure is built up actuating a pressure switch 234 to complete an energizing circuit for a relay 236. Relay 236 draws up contacts 237 to complete an energizing circuit for a transformer 238 that controls the energization of a solenoid 239 which functions to allow the ram in the machine 23 to be restored to the initial position. This occurs since energization of relay 236 opens contacts 241 contained in the energizing circuit of transformer 231.

When relay 236 is operated, contacts 242 are closed to complete an energizing circuit for a relay 243 that is locked up through its contacts 244. Energization of relay 243 opens contacts 245 and closes contacts 246 to condition a circuit for a relay 247. Energization of relay 243 also closed contacts 248 to complete a shunt circuit around the contacts 208, therefore allowing the transfer mechanism to recycle without the closure of the contacts 208 by the cam 207.

On retract movement of the transfer bars 51 and 53 toward the left, a limit switch 251 is actuated to energize a transformer 252 that functions to operate a solenoid 253 to advance the pawl 64 to move an empty slot 58 in magazine 57 into position to receive a comb. When the transfer bars 51 and 53 complete the retract movement, a limit switch 254 is closed to complete an energizing circuit for a transformer 256 that functions to energize the solenoid 257 to withdraw the pawl 64 to the initial position. Simultaneous with the energization of the transformer 256, a time delay relay 258 is also energized which after a relatively short period of time opens contacts 259 to interrupt the energizing circuit to the transformer 256.

The second cycle is started when the transfer bars 51 and 53 advance to insert a finished comb into the magazine 57 and move the other combs forward one position. Limit switch 212 is again actuated to complete the circuit to the transformer 213 to effectuate a retraction of the transfer bar in the manner previously described.

On this second cycle, the closing of contacts 218 of relay 216 effectuates an energization of the tapped coil mechanically held relay 247 since the contacts 246 are now closed by the energized relay 243. This action causes contacts 255 to open and contacts 260 to close. Closure of contacts 218 also energizes transformer 231 and as a result the ram in the machine 23 again moves down. As hydraulic pressure is built up, the switch 234 is again operated to energize the transformer 238 thereby permitting the rams to go up in the manner previously described.

When pressure switch 234 is operated, the relay 236 is energized to close contacts 242 to complete an energizing circuit through contacts 261 held up by now energizing relay 221, through contacts 242, and the now drawn up contacts 260 of the relay 247 to a relay 262. Energization of relay 262 interrupts the energizing circuits for the relays 221 and 243 through contacts 263 and 264, respectively. Interruption of the energizing circuit to the relay 243 allows the relay contacts 248 to again open thereby making a further cyclic operation of the transfer mechanism dependent upon closure of the contacts 208 by the cam 207. Further, release of the relay 243 effectuates the restoration of the tapped coil relay 247 by allowing a circuit to be completed through the now closed contacts 245 and the now closed contacts 265 of relay 247. The circuit is now in condition for continued cyclic operation which will be initiated by the closure of the contacts 208 by the cam 207.

The insertion of finished combs into the magazine slot 58 will continue as explained until one vacant slot remains. Upon the retract stroke of the transfer bars after placing a comb in the next to the last slot 58 in the magazine 57, limit switch 251 is actuated as usual energizing transformer 252 to effectuate an operation of the pawl 64 to advance the last slot into register with the transfer bars. As the magazine 57 is raised in this situation, limit switch 266 is closed and a limit switch 267 is opened. There is no function performed at this time as a result of the actuation of these limit switches because the transfer bar is on the retract stroke and the limit switch 212 is opened. The opening of limit switch 267 has no effect because the magazine lift mechanism associated with the transformer 252 has already operated.

When the transfer bars move forward to deliver the last comb, limit switch 212 is actuated to energize the relay 216, and in addition, relays 268 and 269. Energization of relay 269 opens contacts 271 contained in the energizing circuit for the transformer 209; consequently, the transfer bars 51 and 53 are precluded from being moved forward. Energization of relay 269 also effectuates an opening of contacts 272 to interrupt the energizing circuit for the relay 224. It will be recalled that this relay controls the continued cyclic operation of the welder, thus the welder cannot initiate another cycle of operation.

Energization of relay 216 also opens contacts 219 to preclude the initiation of an indexing operation of the righthand magazine device 56 that is controlled by a solenoid 273. Energization of relay 268 effectuates the closure of contacts 274 to complete an energizing circuit to a solenoid 276 that functions to withdraw a shot pin from engagement with the righthand magazine mechanism 56. Withdrawal of the shot pin effectuates a movement of a contact 277 into engagement with its upper stationary contact. As soon as the transfer bars are moved from limit switch 212, the relay 216 releases and contacts 219 close to complete an energizing circuit for the solenoid 273 which functions to index the magazine device 56 to present a new magazine in position to receive the combs. As the device 56 moves into the new position, a limit switch 278 is closed to complete an energizing circuit through now closed contacts 280 of relay 268 for the solenoid 279 which moves the shot pin back into engagement with the magazine device 56. Movement of the shot pin into engaging position effectuates the movement of a switch 281 into engagement with an upper contact to complete an energizing circuit for a solenoid 282 which functions to withdraw the magazine device indexing mechanism to an initial position. Closure of contact 281 is accompanied by a closing of a contact 283, and the repositionment of the contact 277 in engagement with its lower contact is accompanied by a closure of contact 284 with its lower contact to complete a circuit through now closed contacts 286 for the relay 269. This circuit is through the entire coil of the relay and functions to release the relay 269. When the turntable actuating mechanism is restored to the initial position, the contacts 281 and 283 are opened.

Recapitulating briefly, it will be noted when there are two or more slots available in the righthand magazine 57, the actuation of the cam switch 208 permits the automatic delivery of two combs and the circuit will be then held in a non-operated condition until the cam switch 208 is again closed. In the situation where there are only two slots left in the magazine, the actuation of the switch 208 allows the transfer bars to deliver two combs and then the circuit will be held in a non-operative condition until the magazine device 56 completes its indexing operation. If a situation exists where there is only one slot available in the magazine, then the transfer bars will advance one comb and withdraw to the retract position and be held there until such time as a new magazine has been advanced, whereafter the circuit will again function to deliver a comb to the slot in the newly positioned magazine.

The operation of the welding machines 21 and 22 is interrupted during the indexing of the magazine device 56. The veracity of this statement is manifest, since during the indexing operation, the relay 269 is energized to open the contact 272 contained in the circuit of the relay 224. It will be remembered that relay 224 controls contact 226 contained in the energizing circuit for the clutch release solenoid 107. Deenergization of solenoid 107 positions the release pawl 168 to interrupt the operation of the clutch 108. Relay 269 is restored to the initial condition upon completion of the indexing operation.

It is possible to operate the transfer bars 51 and 53 independently of the operation of the welding machines 21 and 22 by moving a contactor 287 into engagement with a fixed contact 288. The effect of this movement of contactor 287 is to establish a shunt circuit around the switch 208 to permit free cyclic operation of the control circuits shown in Figs. 5 and 6. In this situation the speed of operation of the transfer mechanism will be determined by the speed of operation of the ram-operated machine 23. In addition, the transfer bars can operate independently of the operation of the ram-operated machine 23 by merely opening a pair of switches 289 and 291.

A safety feature is provided for the transfer bars associated with machine 23 in that a mechanical overload switch 292 is provided to be actuated upon the existence of a jamming or mechanical overload condition of the transfer bars 51 and 53. Obviously, the opening of the switch 292 interrupts the energizing circuits to all the control relays, and as a result all the machines will come to a stop. In addition, a comb sensing switch 293 is provided to ascertain if a comb is in position to be advanced into the righthand magazine device 56. If a comb is not present then the switch 293 is opened to interrupt the energizing circuit for the transformer 252, and as a consequence thereof, the magazine lifting solenoid 253 is not operated.

It is to be understood that the above described arrangements of apparatus and circuits and construction of elemental parts are simply illustrative of an application of the principles of the invention and many other modifications may be made without departing from the invention.

What is claimed is:

1. In a transfer apparatus for sequentially advancing work pieces through a pair of machines, a first means for advancing work pieces through the first machine, a second means for advancing work pieces from the first advancing means through the second of said machines, means controlled by said second machine for initiating a cycle of operation of both said advancing means, and means controlled by said first machine for initiating a second cycle of operation of said first advancing means.

2. In an automatic transfer apparatus for sequentially advancing work pieces through a series of machines, a storage device for storing work pieces, a first transfer mechanism for advancing work pieces from said storage device to a first of said machines, a second transfer mechanism for advancing work pieces from said first transfer mechanism to a second of said machines, means actuated by the second machine for actuating said second transfer mechanism, means actuated by said second machine for initiating a cycle of operation of said first transfer mechanism, and means for initiating a second cycle of operation of said first transfer mechanism independently of the second machine.

3. In an automatic transfer apparatus for sequentially advancing work pieces through a series of fabricating machines, means for storing work pieces, a first transfer means for advancing work pieces from said storage means to a first of said machines, a second transfer means for advancing work pieces from said first transfer means to a second of said machines, means controlled by said second machine for initiating operation of said first and second transfer means, and means controlled by said first transfer means for initiating operation of said second machine.

4. In an apparatus for advancing work pieces through a series of fabricating machines, means for storing work pieces, a first transfer means for advancing work pieces one at a time from said storage means to a first of said machines, a second transfer means for advancing work pieces two at a time from said first transfer means to a pair of said machines, means controlled by said pair of machines for initiating a cycle of operation of both said transfer means, and means controlled by said first machine for initiating a second cycle of operation of said first transfer means.

5. In a transfer apparatus for sequentially advancing work pieces through a series of machines, means for storing said work pieces, a first means for advancing work pieces from said storing means to a first of said machines, a second means for advancing work pieces from the said first advancing means to a second of said machines, a receiving means for said work pieces, a third means for advancing work pieces from said second advancing means through a third machine to said receiving means, means actuated by said second machine for initiating a first cycle of operation of all said advancing means, and means associated with the first machine for initiating a second cycle of operation of said first transfer means.

6. In a transfer apparatus for sequentially advancing work pieces through a series of machines, means for storing said work pieces, a first means for advancing work pieces from said storing means to a first of said machines, a second means for advancing work pieces from said first advancing means to a second of said machines, means for receiving said work pieces, a third means for advancing work pieces from said second advancing means through a third machine to said receiving means, means actuated by the second machine for initiating a cycle of operation of all said advancing means, and means associated with the third machine for initiating a second cycle of operation of said third advancing means.

7. In a transfer mechanism for advancing a series of parts through a series of fabricating machines operating at different speeds, a first transfer device for advancing parts through a first group of machines at a first predetermined speed, a second transfer device for advancing parts from the first transfer device at a speed different from the speed of the first and through a second group of machines, means controlled by said second transfer device for initiating a cycle of operation of said first transfer device, means actuated by said first transfer device for initiating a second cycle of operation of said first transfer device, and means actuated by the first transfer device completing a second cycle of operation for initiating a second cycle of operation of said second transfer device.

8. In a transfer apparatus for advancing parts from a supply magazine through a series of three fabricating machines to a receiving magazine, a first transfer mechanism associated with a first of said machines, means for operating the first transfer mechanism to advance parts from said supply magazine one at a time, a second transfer mechanism adapted to advance two parts at a time from the first transfer mechanism, means controlled by the second machine for operating the second transfer mechanism, a third transfer mechanism associated with said third machine, means for operating the third transfer mechanism to advance parts from the second transfer mechanism to said receiving magazine, and means controlled by said second machine for limiting the operation of the first and third transfer mechanisms to two cycles of operation for each cycle of operation of the second transfer mechanism.

9. In a transfer mechanism for advancing work pieces through a series of fabricating machines, an indexable storage mechanism for said work pieces, a first means for advancing work pieces from said storage mechanism through a first of said machines, a second means for advancing work pieces from said first advancing means to a second of said machines, means controlled by said second machine for initiating a first cycle of operation of both said advancing means, means controlled by said first machine for initiating a second cycle of operation of said first advancing means, means controlled by a predetermined number of cyclic operations of said first transfer means for indexing said storage mechanism, and means controlled by the indexing of said storage mechanism for interrupting operation of said advancing means.

10. In a transfer mechanism for advancing work pieces through a series of fabricating machines, a first transfer mechanism for advancing work pieces through a first of said machines, an indexable receiving means for said work pieces, a second transfer mechanism for advancing work pieces from the first transfer mechanism through a second of said machines to said indexable receiving means, means controlled by said first machine for initiating a first cycle of operation of both said transfer mechanisms, means actuated by said second machine for initiating a second cycle of operation of said second transfer mechanism, means actuated by said second transfer mechanism delivering a predetermined number of work pieces to said receiving means for indexing said receiving means, and means actuated by said indexing of said receiving means for precluding cyclic operation of both said transfer mechanisms.

11. In a transfer apparatus for advancing work pieces through a pair of cyclically operatable machines, a first means for advancing work pieces through a first of said machines, a second means for advancing work pieces from said first advancing means through said second machine, means for operating said first machine through a pair of cyclic operations, means controlled by each cyclic operation of said first machine for operating said first advancing means, means operated by said second machine for initiating operation of said operating means associated with the first machine, and means operated by said first machine completing a pair of operations for initiating said second machine into a cycle of operation.

12. In an automatic transfer mechanism for advancing work pieces from an indexable magazine through a pair of machines, a first means for advancing work pieces from the magazine through a first of said machines, means controlled by said first advancing means for indexing said magazine to present work pieces to said first advancing means, a second means for advancing work pieces from said first advancing means through a second of said machines, means controlled by the second machine for initiating a pair of operations of said first advancing means, means controlled by said first advancing means for cyclically operating said second machine, and means operated by the magazine being indexed a predetermined number of times and said first advancing means for interrupting operation of said second machine.

13. In a transfer apparatus for advancing work pieces through a pair of machines to an indexable receiving magazine, a first means for advancing work pieces through a first of said machines, means for cyclically operating said first machine and the first advancing means, a second means for advancing work pieces from the first advancing means through a second of said machines to the indexable receiving magazine, means controlled by said second advancing means for indexing said magazine to receive each work piece, means controlled by said first machine for initiating a pair of operations of said second advancing means for each operation of said first advancing means, means operated by the magazine being indexed a predetermined number of times for interrupting operation of said first machine.

14. In a transfer apparatus for advancing work pieces through a pair of cyclically operable machines, a first means for cyclically advancing work pieces through a first of said machines, a second means for cyclically advancing work pieces through the second of said machines, a first control circuit for operating said first advancing means and said first machine, a second control circuit for operating said second machine and said second advancing means, a switch included in said first control circuit for initiating operation of said first control circuit, means operated by said second machine for closing said switch whereby said first advancing means and said first machine are operated, a shunt circuit including a normally open contact connected around the switch, relay means included in said first control circuit and operated by operation of said first control circuit for closing said normally open contact while the first advancing means continues to operate through a second cycle of operation, and means operated by the first control circuit during operation of said first advancing means for interrupting said second control circuit to preclude a subsequent cycle of operation of said second machine until said first machine and said first advancing means have completed two cycles of operation.

15. In an apparatus for transferring work pieces through a pair of machines, a first means for advancing work pieces through a first of said machines, a second means for advancing work pieces through a second of said machines, a first control circuit for initiating operation of the first machine and the first advancing means, a second control circuit having a normally open contact for operating said second advancing means, means operated by the first machine for momentarily closing the normally open contact to initiate operation of said second control circuit to operate said second advancing means and said second machine, a shunt circuit around said normally open contact operated by said second control circuit for initiating said second advancing means and said second machine into a second cycle of operation, and means in said control circuit controlled by the operation of said second advancing means and said second machine for interrupting said first control circuit to preclude a second cycle of operation of said first machine and said first advancing means until said second machine and said second advancing means having completed two cycles of operation.

16. In an automatic transfer apparatus for sequentially advancing work pieces through a series of fabricating machines, a first transfer means for advancing work pieces through a first of said machines, a second transfer means for advancing work pieces from said first advancing means through a second of said machines, first means controlled by said second machine for initiating a cycle of operation of both of said advancing means, second means controlled by said first machine for initiating a second cycle of operation of said first transfer means for every operation of said first controlled means, and third means controlled by said first transfer means on the second cycle of operation thereof for initiating operation of said second machine.

References Cited in the file of this patent
UNITED STATES PATENTS

| | | |
|---|---|---|
| 1,978,004 | Winkley | Oct. 23, 1934 |
| 2,794,536 | Da Roza et al. | June 4, 1957 |
| 2,835,082 | Green | May 20, 1958 |